(12) United States Patent
Cohen et al.

(10) Patent No.: US 11,750,683 B2
(45) Date of Patent: *Sep. 5, 2023

(54) COMPUTER APPLICATION PROMOTION

(71) Applicant: Google LLC, Mountain View, CA (US)

(72) Inventors: Gabriel Aaron Cohen, Alameda, CA (US); Paul Nicholas Gennai, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,927

(22) Filed: May 11, 2022

(65) Prior Publication Data
US 2022/0272143 A1 Aug. 25, 2022

Related U.S. Application Data

(63) Continuation of application No. 15/657,899, filed on Jul. 24, 2017, now Pat. No. 11,368,556, which is a
(Continued)

(51) Int. Cl.
*H04L 67/01* (2022.01)
*G06F 16/95* (2019.01)
(Continued)

(52) U.S. Cl.
CPC .......... *H04L 67/01* (2022.05); *G06F 8/61* (2013.01); *G06F 9/445* (2013.01); *G06F 16/95* (2019.01);
(Continued)

(58) Field of Classification Search
CPC ......... H04L 67/42; H04L 67/34; G06F 16/95; G06F 16/951; G06F 8/61; G06F 9/445; G06Q 30/02; H04W 4/00
See application file for complete search history.

(56) References Cited

U.S. PATENT DOCUMENTS 7,072,886 B2 7/2006 Salmenkaita et al.
7,930,301 B2 4/2011 Marcjan et al.
(Continued)

FOREIGN PATENT DOCUMENTS

CN 1540552 A 10/2004
CN 101657813 A 2/2010
(Continued)

OTHER PUBLICATIONS

Response to Extended Search Report dated Nov. 11, 2021, from counterpart European Application No. 21197897.8 filed Aug. 4, 2022, 15 pp.
(Continued)

*Primary Examiner* — Hares Jami
(74) *Attorney, Agent, or Firm* — Shumaker & Sieffert, P.A.

(57) ABSTRACT

A computer-implemented process includes providing a request to access content associated with a website; receiving web page information associated with the website, and data for displaying a notification that indicates availability of a native computer application that is associated with the website; providing a request to access information associated with the native computer application; receiving information associated with the native computer application that describes interactions between a plurality of users of an application marketplace and a component of the application marketplace that provides and receives information related to the native computer application; and displaying the descriptive information for viewing by a user, including displaying information that indicates the interactions between the plurality of users and the component of the application marketplace.

20 Claims, 7 Drawing Sheets

Related U.S. Application Data continuation of application No. 13/716,025, filed on Dec. 14, 2012, now Pat. No. 9,762,698.

(51) Int. Cl.
| | |
|---|---|
| *G06F 16/951* | (2019.01) |
| *H04W 4/00* | (2018.01) |
| *H04L 67/00* | (2022.01) |
| *G06F 8/61* | (2018.01) |
| *G06F 9/445* | (2018.01) |
| *G06Q 30/02* | (2023.01) |

(52) U.S. Cl.
CPC .......... *G06F 16/951* (2019.01); *G06Q 30/02* (2013.01); *H04L 67/34* (2013.01); *H04W 4/00* (2013.01)

(56) References Cited

U.S. PATENT DOCUMENTS

| | | | |
|---|---|---|---|
| 8,065,675 | B2 | 11/2011 | Strauss et al. |
| 8,175,989 | B1 | 5/2012 | Gopinath et al. |
| 8,230,016 | B1 | 7/2012 | Pattan et al. |
| 8,239,918 | B1 | 8/2012 | Cohen |
| 8,566,173 | B2 | 10/2013 | Mahaniok et al. |
| 8,832,817 | B2 | 9/2014 | Cohen |
| 9,064,028 | B2 | 6/2015 | Shen et al. |
| 9,762,698 | B2 | 9/2017 | Cohen et al. |
| 2002/0062247 | A1 | 5/2002 | Allen |
| 2004/0043758 | A1 | 3/2004 | Sorvari et al. |
| 2005/0149428 | A1 | 7/2005 | Gooch et al. |
| 2007/0028266 | A1 | 2/2007 | Trajkovic et al. |
| 2008/0059571 | A1* | 3/2008 | Khoo .................... G06Q 30/02 705/14.46 |
| 2008/0126176 | A1 | 5/2008 | Iguchi |
| 2008/0154738 | A1 | 6/2008 | Jain et al. |
| 2008/0235680 | A1 | 9/2008 | Strauss et al. |
| 2008/0243632 | A1 | 10/2008 | Kane et al. |
| 2009/0018894 | A1 | 1/2009 | Zamani et al. |
| 2009/0089416 | A1 | 4/2009 | Chi |
| 2009/0163183 | A1 | 6/2009 | O'Donoghue et al. |
| 2009/0313086 | A1 | 12/2009 | Lee et al. |
| 2011/0077951 | A1 | 3/2011 | Tullis |
| 2011/0208801 | A1* | 8/2011 | Thorkelsson ......... H04L 67/567 715/764 |
| 2011/0225291 | A1 | 9/2011 | Dobroth et al. |
| 2012/0010996 | A1 | 1/2012 | Horvitz et al. |
| 2012/0060110 | A1 | 3/2012 | Virmani et al. |
| 2012/0072312 | A1 | 3/2012 | Lange et al. |
| 2012/0084292 | A1 | 4/2012 | Liang et al. |
| 2012/0096435 | A1 | 4/2012 | Manolescu et al. |
| 2012/0124028 | A1 | 5/2012 | Tullis et al. |
| 2012/0124062 | A1 | 5/2012 | Macbeth et al. |
| 2012/0159307 | A1 | 6/2012 | Chung et al. |
| 2012/0254097 | A1 | 10/2012 | Flinn et al. |
| 2012/0284247 | A1 | 11/2012 | Jiang et al. |
| 2012/0284256 | A1 | 11/2012 | Mahajan et al. |
| 2012/0316955 | A1 | 12/2012 | Panguluri et al. |
| 2013/0014040 | A1 | 1/2013 | Jagannathan et al. |
| 2013/0097596 | A1* | 4/2013 | Queru .................... H04L 67/34 717/176 |
| 2013/0139271 | A1 | 5/2013 | Arrelid et al. |
| 2013/0290369 | A1 | 10/2013 | Sayers et al. |
| 2013/0339345 | A1* | 12/2013 | Soto Matamala .... G06F 16/248 707/722 |
| 2014/0019958 | A1* | 1/2014 | Sherman .................... G06F 8/61 717/178 |
| 2014/0052683 | A1* | 2/2014 | Kirkham .................. G06N 5/04 706/46 |
| 2014/0059213 | A1 | 2/2014 | Ollikainen et al. |
| 2014/0172911 | A1 | 6/2014 | Cohen et al. |
| 2014/0250105 | A1 | 9/2014 | Shankar |
| 2017/0359446 | A1 | 12/2017 | Cohen et al. |

FOREIGN PATENT DOCUMENTS

| | | |
|---|---|---|
| CN | 101689193 A | 3/2010 |
| WO | 2012/154838 A3 | 11/2012 |
| WO | 2012/154843 A1 | 11/2012 |
| WO | 2013/050649 A1 | 4/2013 |

OTHER PUBLICATIONS

Apple Support [online]. "Genius for iPod and !Phone," 2010, [retrieved on May 16, 2012] Retrieved from the Internet: URL <support.apple.com/kb/HT2978>. 3 pages.

Google Mobile Help [online]. "Gmail 'app' shortcut." 2012, [retrieved on May 16, 2012]. Retrieved from the Internet: URL <support.google.com/mobile/bin/answer.py?hl=en&answer=31238>.1 page.

MaxaBlog [online]. "Mobile apps choices: Native Apps vs Web Apps," 2011, [retrieved on Apr. 5, 2012]. Retrieved from the Internet: URL <mkblog.exadeL.com/2011/04/mobile-apps-choices-native-apps-vs-web-apps/>. 8 pages.

Pandawhale [online]. "What's so great about mobile apps? Not every service needs one," 2011 [retrieved on May 16, 2012], Retrieved from the Internet: URL <pandawhale.com/convo/230/whats-so-great-about -mobile-apps-not -every-service-needs-one>. 4 pages.

Weblog-CenriqueOrtiz [online] "Mobile Apps in 2009: Local/Native, Mobile Web, App Stores," 2009, [retrieved on Apr. 5, 2012]. Retrieved from the Internet: URL<weblog.cenriqueortiz.com/mobility/2009/01/02/mobile-app-in-2009-ocalnative-mobile-web-app-stores/>. 4 pages.

Examination Report from counterpart IN Application No. 4085/CHENP/2015 dated May 26, 2020, 6 pgs.

Extended Search Report from counterpart European Application No. 19200906.6, dated Dec. 4, 2019, 9 pp.

Extended Search Report from counterpart European Application No. 21197897.8 dated Nov. 11, 2021, 11 pp.

First Office Action and Search Report, and translation thereof, from counterpart Chinese Application No. 201810856311.6, dated Apr. 28, 2021, 25 pp.

Hudson, C. 'Insidemobileapps' [online]. "Mobile App Discovery is a Developer Problem, Not a Consumer Problem," 2011, [retrieved on Apr. 5, 2012]. Retrieved from the Internet: URL <www.insidemobileapps.com/2011/06/27/mobile-app-discovery/>. 3 pages.

Intent to Grant dated May 3, 2019, from counterpart European Application No. 13812416.9, 60 pp.

International Search Report and Written Opinion in International Application No. PCT/US2013/054922, dated Dec. 6, 2013, 12 pages.

International Search Report and Written Opinion in International Application No. PCT/USB/74406, dated Oct. 9, 2014, 11 pages.

International Search Report and Written Opinion dated Sep. 26, 2014 in Application No. PCT/US2014/020141, 12 pages.

Mahmoud and Popowicz. Toward a Framework for the Discovery and Acquisition of Mobile Applications, 2010 Ninth International Conference on Mobile Business/2010 Ninth Global Mobility Roundtable, IEEE Computer Society, Jun. 13-15, 2010, pp. 58-65.

Metcalfe, J. 'itsmsolutions' [online], "How to Select and Implement the Right CMDB," 2007, [retrieved on Apr. 5, 2012]. Retrieved from the Internet: URL <www.itsmsolutions.com/newsletters/DITYvol3iss16.htm> 7 pages.

Microsoft Tech Net website (Certification Authority Trust Model Page): https://technet.microsoft.com/en-usi/library/cc962065.aspx, [retrieved in 2012] 7 pages Applicant points out, in accordance with MPEP 609.04(a), that the year of publication, 2012, is sufficiently earlier than the effective U.S. filing date, so that the particular month of publication is not in issue.

Microsoft website (Public Key Infrasttructure Page): https://msdn.microsoft.com/enus/library/windows/desktop/ob427432 (v=vs.85).aspx, [retrieved in 2012] 3 pages Applicant points out, in accordance with MPEP 609.04(a), that the year of publication, 2012, is sufficiently earlier than the effective U.S. filing date, so that the particular month of publication is not in issue.

(56) References Cited

OTHER PUBLICATIONS

Nash, S. 'Ignitemybrand' [online]. "Web apps versus mobile apps—which is right for my business?," 2011, [retrieved on Apr. 5, 2012]. Retrieved from the Internet: URL <www.ignitemybrand.com.au/blog/web-apps-versus-mobile-apps.php>. 2 pages.

Notice of Intent to Grant and Text Intended to Grant from counterpart European Application No. 19200906.6, dated Jun. 9, 2021, 54 pp.

Notice of References Cited Part of Paper No. 20190503, 2012 Applicant points out, in accordance with MPEP 609.04(a), that the year of publication, 2012, is sufficiently eadier than the effective U.S. filing date, so that the particular month of publication is not in issue.

OnmiSecu website (Fully Qualified Domain Name (FQDN) and Partially Qualified Domain Name (POON) Page): http://www.omnisecu.com/tcpip/fully-qualified-domain-name-fqdn-and-partially-qualified-domain-name-pqdn.php, [retrieved in 2012] 3 pages Applicant points out, in accordance with MPEP 609.04(a), that the year of publication, 2012, is sufficiently earlier than the effective U.S. filing date, so that the particular month of publication is not in issue.

Oracle Security Overview 10g Release 1 (10.1) website (The Public Key Infrastructure Approach to Security Page): http://docs.oracle.com/cd/B12037_01/network.101/b10777/pki.htm, 2003, 7 pages Applicant points out, in accordance with MPEP 609.04(a), that the year of publication, 2003, is sufficiently earlier than the effective U.S. filing date, so that the particular month of publication is not in issue.

Parparita, M., "There's a Web App For That," Up to Down, Jul. 29, 2011 [retrieved on Sep. 17, 2015] retrieved from the Internet: URL<http://theres-web-app.en.uptodown.com/>, (4 pages).

Prosecution History from U.S. Appl. No. 13/716,025, dated Jul. 2, 2014 through Apr. 20, 2017, 154 pp.

Prosecution History from U.S. Appl. No. 15/657,899, dated May 15, 2019 through Mar. 2, 2022, 174 pp.

Response to the Extended European Search Report from counterpart EP Application No. 19200906.6 dated Dec. 4, 2019, filed Sep. 23, 2020, 13 pgs.

Response to the First Examination Report from counterpart IN Application No. 4085/CHENP/2015 dated May 26, 2020, filed Nov. 24, 2020, 11 pgs.

Shepard, L. 'FacebookDevelopers' [online], "Bringing Social App Discovery to Mobile—Facebook Developers," 2011, [retrieved on Apr. 5, 2012], Retrieved from the Internet: URL <developers.facebook.com/blog/post/575/>. 3 pages.

SSLShopper website (Public Key Infrastructure (PKI) Overview Page):https://sslshopper.com/public-key-infrastructure-pki-overview.html, Apr. 3, 2010, 2 pages.

Tofel, K. 'gigaom' [online], "HTML5 key to Facebook's mobile app discovery, engagement," 2011, [retrieved on Apr. 5, 2012], Retrieved from the Internet: URL <gigaom.com/mobile/html5-key-to-facebooks-mobile-app-discovery-engagement/>. 11 pages.

Tseng, B. 'Benjamintseng' [online], "Web vs. native," 2011, [retrieved on Apr. 5, 2012]. Retrieved from the Internet: URL <www.benjamintseng.com/2011/09/web-vs-native/>. 10 pages.

Vo and Torabi. "A Framework for Over the Air Provider-initiated Software Deployment on Mobile Devices," 19th Australian Conference on Software Engineering, IEEE Computer Society, Mar. 26-28, 2008, pp. 633-638.

Weber, R 'Clickz' [online], "Tips on How to Get Top iPhone Apps," 2010, [retrieved on Apr. 5, 2012]. Retrieved from the Internet: URL <www.clickz.com/clickz.icolumn/1721811/tips-how-get-top-iphone-apps>.14 pages.

WhatIsMyIPAddress website (What is a hostname? Page): http://whatismyipaddress.com./hostname, [retrieved in 2012] 4 pages Applicant points out, in accordance with MPEP 609.04(a), that the year of publication, 2012, is sufficiently eadier than the effective U.S. filing date, so that the particular month of publication is not in issue.

Yan and Chen. "AppJoy: Personalized Mobile Application Discovery," MobiSys'11, Bethesda, Maryland, Jun. 28-Jul. 1, 2011,14 pages.

Communication pursuant to Article 94(3) EPC from counterpart European Application No. 21197897.8 dated Mar. 17, 2023, 6 pp.

\* cited by examiner

COMPUTER APPLICATION PROMOTION

This application is a continuation of U.S. patent application Ser. No. 15/657,899, entitled "COMPUTER APPLICATION PROMOTION," filed Jul. 24, 2017, which claims the benefit of U.S. patent application Ser. No. 13/716,025, entitled "COMPUTER APPLICATION PROMOTION," filed Dec. 14, 2012, the contents of each of which are hereby incorporated by reference as if set forth in their entirety.

TECHNICAL FIELD

The present disclosure relates to the distribution of application software to computing devices.

BACKGROUND

Mobile computing devices, such as smartphones, have advanced greatly in sophistication over the last few years. Many mobile devices can now have applications loaded onto them from third parties, such as applications to permit a user to read a particular newspaper, to play games, and to perform various business functions.

Computer applications can be classified into at least two groups or types: native applications and web applications. Web applications generally run as part of a web browser that is separately loaded onto a computing device, whereas native applications are executable apart from a web browser. Web applications may be easy to code and to use, while native application may provide a richer experience that is not constrained by limits of HTML coding or the particular browser that may be loaded on a device.

SUMMARY

This document discusses systems and techniques by which a user may be presented with an opportunity to load a native application, such as when the user is consuming resources associated with a web property (e.g., a particular web page or web site) that corresponds to the native application. In such a situation, a computing device may be directed, by code that is part of a web page, to an application marketplace from which the user may load the corresponding native application onto his or her device. For example, a user may visit a web site for a newspaper, and may be shown a pop-up box that indicates that a native newsreader application is available for installation on the user's device for that particular newspaper.

The pop-up box or other appropriate user interface component may be generated by using information that is obtained from the application marketplace (which is operated by an organization that is independent of the organization that provides the web page), such as pricing information and rating information from other users who have visited the application marketplace to provide rating and perhaps to purchase (for a price or for free) the native application. The user may then be redirected to the application marketplace if they so choose (e.g., by opening a new browser tab aimed at a web page for the application marketplace from which the particular native application can be downloaded, or by causing a marketplace-directed application on the computing device to launch and be directed to such native application for download).

In certain implementations, such systems and techniques may provide one or more benefits. For example, a user who has shown interest in a particular topic may be identified by the user visiting a web page related to the topic, and then may be presented with an opportunity to download a native application for the topic. The provider of the web page can provide such functionality without having to serve the native application itself; rather, the application marketplace can be referred to and can handle such processing (including handling storage of the native application, interaction with application developers, bandwidth for the downloading of applications, and processing of financial transaction relating to the purchasing of applications).

Users may benefit from an improved experience by not having to search out native applications in which they may have a particular interested. Publishers of web pages may benefit from being able to provide users with native applications that may give a better user experience, and may provide a tighter bond with such users (which may, for example, lead to the user visiting content from a publisher more often, and thereby generating more advertising revenue for the publisher). And advertisers may benefit from being able to provide richer advertising experiences in native applications compared to what they could deliver in a web application, and also in being able to purchase ads with a publisher that cause their own native applications to be promoted by the publisher's web properties, as opposed to or in addition to the publisher's native application or applications being promoted.

In other circumstances, a web browser may identify the site as being associated with a native application without the site providing code that identifies such an association. For example, a browser may reference a third-party domain (i.e., that is separate from the web site) when it visits each web site, and submits a domain or URL for the web site to determine from the third-party domain, whether a native application is available for the web site. The computing device may then provide information and access to a marketplace in similar manners to that discussed for the example in which the web page provides the native application information. In one implementation, a computer-implemented process is disclosed that comprises providing, from a computing device to a first server system, a request to access content associated with a website; receiving, at the computing device from the first server system, web page information associated with the website, and data for displaying a notification that indicates availability of a native computer application that is associated with the website; providing, by the computing device to a second server system, a request to access information associated with the native computer application; receiving, at the computing device from the second server system, information associated with the native computer application that describes interactions between a plurality of users of an application marketplace and a component of the application marketplace that provides and receives information related to the native computer application; and displaying the descriptive information for viewing by a user of the computing device, including displaying information that indicates the interactions between the plurality of users and the component of the application marketplace. The request to access information can be provided to the second server system in response to a user of the computing device selecting the notification that is displayed with the web page information associated with the website.

In certain aspects, the information associated with the native computer application includes information for generating a download control that when selected by the user instantiates a procedure that causes the native computer application to be installed on the computing device. Also, the process can include installing the native computer application on the computing device in response to receiving selection of the download control by the user. The first server system can be operated by a first organization, and the second server system is operated by a second organization that is different than the first organization. As additional features, the process can include receiving, at the computing device, a search query from the user of the computing device; submitting the search query to the first server system; receiving a plurality of search results responsive to the search query; and displaying the search results for viewing by the user of the computing device, the search results at least including the web page information associated with the website and data for displaying the notification, the data arranged to display the notification with a search result, of the search results, that has been identified as being associated with the native computer application.

In yet other aspects, the descriptive information is selected from the group consisting of: user reviews of the native computer application; composite ratings of a plurality of users of the native computer application; launch date information for the native computer application; and sales volume of the native computer application from the application marketplace. In other aspect, the process also includes receiving selection of the displayed descriptive information by the user and, in response, displaying additional detail about the descriptive information.

In another implementation, a computer-implemented process is disclosed that comprises providing a search query from a computing device to a search engine system; receiving, from the search engine system, data that represents (a) a plurality of search results and (b) identification of a native software application associated with at least one of the search results; and displaying the search results within a browser application on the computing device, for viewing by a user of the computer device, while displaying a user-selectable control in proximity to the browser application, with the at least one of the search results to which the native software application is associated, the user-selectable control, when selected by the user of the computing device, causing the native software application to be downloaded to the computing device. The process can further comprise providing, from the computing device to an application marketplace server system that has a domain that is different from a domain for the search engine system, a request for descriptive information associated with the native software application. Also, the process can comprise receiving the descriptive information at the computing device and from the application marketplace server system. Moreover, the process can also include displaying with the user-selectable control, information that indicates interaction between users of the application marketplace server system and a component of the application marketplace server system that corresponds to the native software application.

In certain aspect, the process also comprises receiving selection of the user-selectable control by the user and installing the native software application on the computing device. The native software application can be downloaded to the computing device only after a user confirms an intent to perform a download. The method can also comprise rendering, by the native software application on the computing device, a web page associated with the at least one search result.

In yet another implementation, a computer-readable storage medium having instructions encoded therein is disclosed. When executed by at least one processor, the instructions cause the at least one processor to perform operations comprising providing, from a computing device to a first server system operated by a first organization, a request to access content associated with a website; receiving, at the computing device from the first server system, web page information associated with the website, and data for displaying a notification that indicates availability of a native computer application that is associated with the website; providing, by the computing device to a second server system that is operated by an organization that is different than the first organization, a request to access information associated with the native computer application; receiving, at the computing device from the second server system, descriptive information associated with the native computer application and that describes interactions between a plurality of users of an application marketplace and a component of the application marketplace that provides and receives information related to the native computer application; and displaying the descriptive information for viewing by a user of the computing device, including displaying information that indicates the interactions between the plurality of users and the component of the application marketplace. The operations can further comprise displaying the descriptive information within a window that is at least partially superimposed over the web page information associated with the website, the descriptive information including at least a download control that when selected by the user instantiates a procedure that causes the native computer application to be installed on the computing device. In addition, the operations may include installing the native computer application on the computing device in response to receiving selection of the download control by the user. Moreover, the operations may comprise automatically launching the native computer application upon completing the installation of the native computer application on the computing device.

In some aspects, the operations include receiving, at the computing device, a search query from the user of the computing device; submitting the search query to the first server system; and receiving a plurality of search results responsive to the search query, the search results at least including the web page information associated with the website and data for displaying the notification, the data arranged to display the notification with a search result, of the search results, that has been identified as being associated with the native computer application.

The details of one or more implementations are set forth in the accompanying drawings and the description below. Other features and advantages will be apparent from the description and drawings, and from the claims.

DESCRIPTION OF DRAWINGS

In the drawings, like reference numbers refer to similar elements throughout.

DETAILED DESCRIPTION

As noted above, native applications can at times and in proper situations, provide an improved user experience to web applications.

People may use mobile websites without realizing that there may be native applications available that have enhanced features or improved capabilities as compared to web applications (or compared to a mere web page that a user is viewing). For example, users may not even know that a particular web application exists, or may have to search for a web application that they know about, even as they spend other time browsing web sites that might be relevant to the web application. It may therefore be advantageous to proactively inform a mobile device user (or a desktop computer user) that a native application is available for download and use.

Figure 1A:
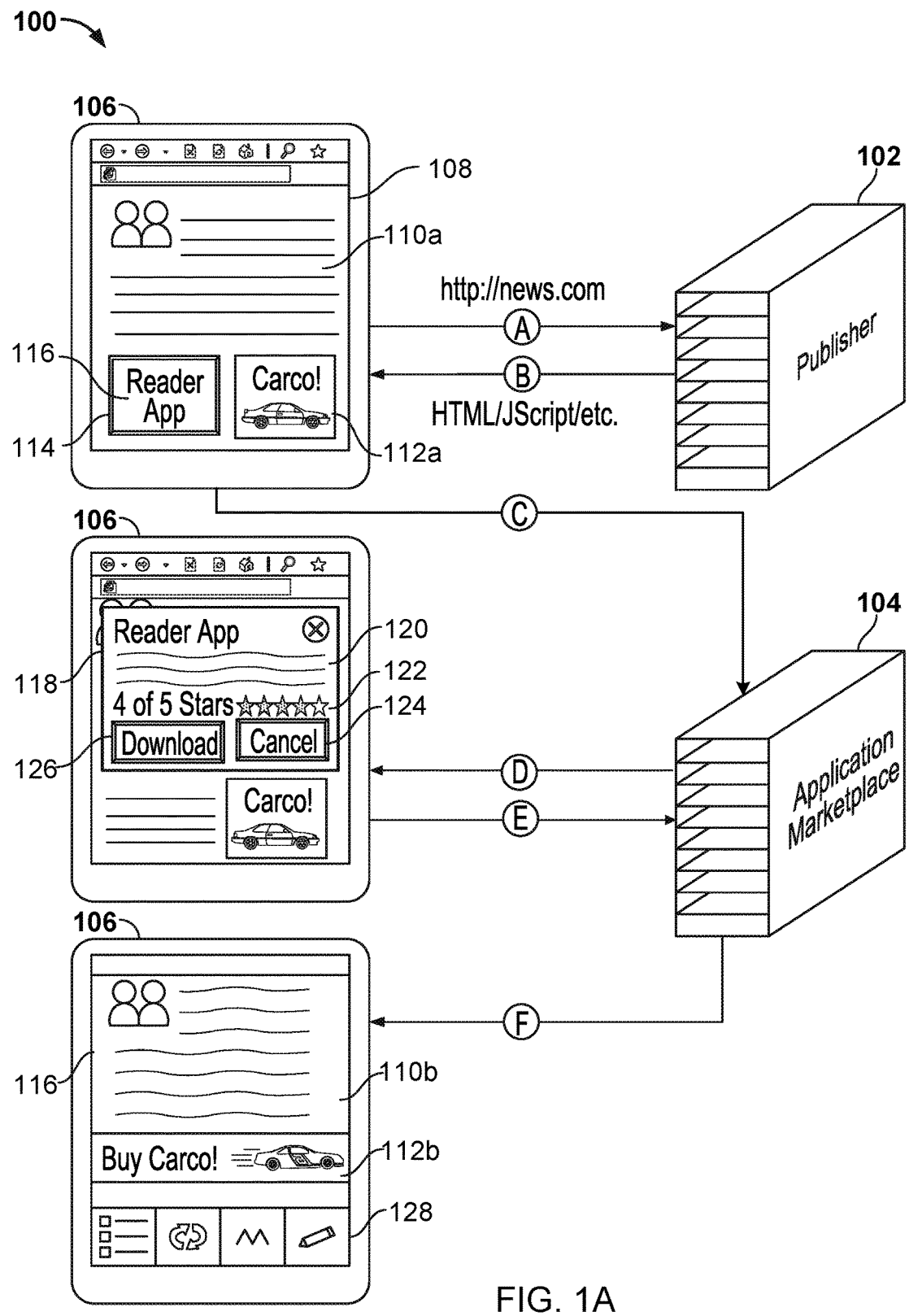
FIGS. 1A-1B show a conceptual diagram of first and second example systems for promoting the use of a native computer application.

For example, and referring now to FIG. 1A, a conceptual diagram of a first example system 100 for promoting the use of a native computer application is shown. In general, the system 100 provides mechanisms by which a user may be notified of the existence of a native application based on web browsing activity by the user that indicates the user might be interested in obtaining the particular native application. For example, the user may visit a web site that has published an associated native application (e.g., an application for more efficiently consuming content that is otherwise published on the web site). Alternatively, an advertiser may pay a publisher of a web site to "surface" as native application available from the advertiser. For example, a software developer may develop a cookbook application, and may pay a cooking website to "surface" offers for downloading the native application from an application store that is operated by a third-party that is separate from the publisher and from the advertiser.

In the example of FIG. 1A, the system 100 includes a publisher server 102, a marketplace server 104, and a device 106. The publisher server 102 and the marketplace server 104 each comprise at least one server computing device. The publisher server 102 is a business system that implements a website that has one or more web pages. The web pages are accessible over a network (not shown), such as the Internet, and include various interactive/non-interactive resources (e.g., text files, audio/video files, etc.) that may be accessed with the device 106, as described in further detail below. The publisher server 102 may, for example, be a server that provides mark-up code for rendering the American Newspaper web site (which comprises a large number of separate web pages). The marketplace server 104, in contrast, is a business system that implements an online software store that allows users to, among other things, browse and download computer applications to compatible computing devices, such as the device 106. The marketplace server 104 may, for example, be a server system for implementing the GOOGLE PLAY marketplace for computer applications.

The device 106 may be a hand-held computing device (e.g., a smartphone, tablet computer, etc.) and at least includes a browser 108 that is installed thereon. (Alternatively, device 106 may be a "netbook," laptop computer, desktop computer, or other form of computing device.) In this example, the browser 108 is configured to enable a user to access resources associated with the website that is hosted by the publisher server 102, and the software provided by the marketplace server 104. The browser 108, however, may not be the optimal software application for this reading the American Newspaper. Rather, a native application may be available that would provide the user an improved quality of experience as compared to the browser 108.

For example, and assuming throughout this example that the publisher server 102 hosts an online newspaper website like the American Newspaper, a user may interact with the browser 108 to request access to a web page "http://example.com" managed by the publisher server 102 at state (A). In response, the publisher server 102 may return content "HTML/JScript/etc." associated with the web page to the browser 108 at state (B). The browser 108 may then interpret and render the content in human-readable format including, for example, a news article 110a, an advertisement 112a, and an alert 114.

In this example, the alert 114 provides a notification to the user that a "Reader App" native application 116 is available for use in accessing and interacting with the online newspaper website hosted by the publisher server 102. The alert 114 may have been generated by JavaScript code that is part of the rendered web page, and may have performed a check to determine that the user did not already have a copy of the relevant news reader application loaded on the device 106. If such an application had been found, the alert 114 could alternatively have asked the user if he or she would like to read the page in the native application instead of in the browser 108. Or, if the native application had been identified, the alert 114 could have been replaced with an alternative notice, such as a regular advertisement (and the user could have been left to independently determine to invoke the already-loaded native application).

The user may read the displayed article and may optionally select the alert 114 (e.g., via "tapping" the display of the alert 114 on a touchscreen display), and the browser 108 (through, e.g., JavaScript that executes with the web page) may then request descriptive information that is associated with the native application 116 from the marketplace server 104 at state (C). In response, the marketplace server 104 may return the descriptive information to the browser 108 at state (D). Optionally, the marketplace server 104 may provide data to the publisher server 102 to notify it that such descriptive information has been requested (e.g., so that the associated publisher may identify the general level of interest in the application). The browser 108 may then render a window 118 that includes the descriptive information such as, for example, review information 120 and rating information 122, along with a cancel control 124 and a download control 126. In some implementations, selection of the displayed descriptive information by the user (e.g., portions of the review information 120 and/or rating information 122 may be linked to a resource and "clicked-on" by the user to access the resource) may generate a "pop-up window" that expands and shows some text and/or graphics (e.g., reviews, ratings text and/or graphics) to display additional detail about the descriptive information.

Other descriptive information that may be provided by the marketplace server 104 includes pricing information, icons that correspond to a native application, a textual description of the application, one or more screen shots of the application, a date on which the application was released, the number of copies of the application that have been downloaded from the application marketplace server 104, and similar information.

Certain elements of the descriptive information may have been obtained by the application marketplace server 104 in a manner that is not readily available to the publisher server 102. For example, the application marketplace may be accessed by a different, and sometimes larger, user group than accesses the newspaper publication. In addition, the publisher's publication system may not support features for users to rate applications, so that rating and review information would be the sort of information that the publisher could not readily gather and provide on its own. Moreover, certain of the information may be of a form that is only available from users who already own and have used an application (e.g., reviews), and such information may more readily be gathered by the application marketplace that delivered the native application (e.g., by providing a selectable control when the application is running in order to have reviews posted from the native application directly to the application marketplace) as compared to the publisher.

The cancel control 124 and the download control 126 generally provide the user a mechanism for optionally installing the native application 116 to the device 106. For example, the user may select the download control 124, and the browser 108 may then request instantiation of a procedure that installs the native application 116 to the device 106 from the marketplace server 104 at state (E). In response to the installation request, the native application 116 may be downloaded and installed to the device 106 from the marketplace server 104 at state (F). For example, a separate native application on the device 106 may manage the downloading of application binaries to the device and the installation of those files in an organized manner on the device.

In another example, the application may be served by the publisher server 112. For example, after a user of the user of device 106 has selected the download control 126, such selection may be indicated to the publisher server 102, which may then serve the application to the device 106 in a predetermined and standardized manner (e.g., via an API published by the operator of the marketplace server 104). Alternatively, the marketplace server 104 may be notified of the selection of the download control 126, and may cause the publisher server 102 to download the application, such as by redirecting the browser 108 on the device 106 to the publisher server 102 in an appropriate manner.

In the example of FIG. 1A, and following installation of the native application 116 on the device 106, the native application 116 may provide enhanced features or improved capabilities as compared to the features offered by the browser 108. For example, the news article 110*a* and the advertisement 112*a* may be rendered by the native application 116 in a more stylized and/or personalized manner as news article 110*b* and advertisement 112*b*, respectively, as compared to how a browser 108 would render them. The native application 116 may additionally provide a touch control 128 to enable a user to more fully interact with resources offered by the publisher server 102, in tandem with the features of the device 106. In this manner, the native application 116 may offer a richer and more immersive user experience when compared to the browser 108.

Other techniques are possible for proactively informing a device user that a native application is available for use. For example, and referring now to FIG. 1B, a conceptual diagram of a second example system 130 for promoting the use of a native computer application is shown. In general, the system 130 provides for the association of a native application with a particular search result that is displayed in a list of search results for a query submitted by a user. A selectable control may be displayed with such a search result to indicate that a native application has been associated with the search result, and a user may select the control to obtain more information about the native application, and then to download and install the native a application.

For example, extending the example of FIG. 1A, the American Newspaper may have included code on its home page that associates the home page with a particular native application and allows a user to be easily redirected to an application marketplace to download (and purchase) a copy of the application. A crawler for a search engine may be programmed to identify such an association in the text of the American Newspaper web page and may make note of such information at crawl time. That note may be then used when the American Newspaper web page (or any page at the American Newspaper domain) is returned to a query as a search result, such that an icon for obtaining information (and perhaps download) about the American Newspaper Reader native application. Such notification of a native application may be provided in-line with the organic search results themselves or to the side as part of a list of advertisements.

Figure 1B:
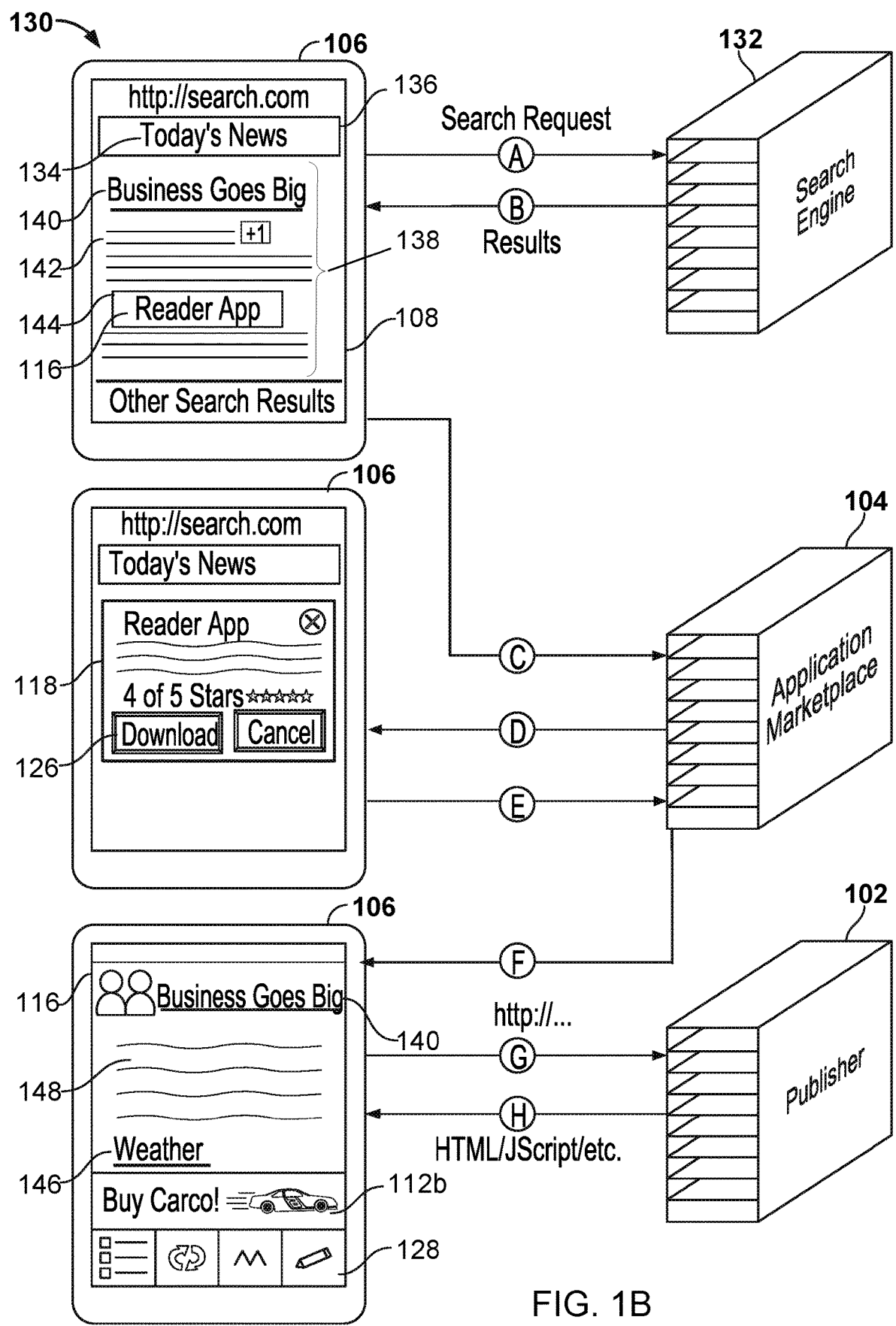

The system 130 includes the publisher server 102, marketplace server 104, and device 106 of FIG. 1A. As shown in FIG. 1B, however, the system 130 also includes a search server 132. In this example, the search server 132 comprises at least one server computing device that hosts or otherwise implements a web search engine that generally allows users to search for information that is accessible over a network such as the internet. Search results provided by the search server 132 may include a notification that a native application is available for use in accessing and interacting with the online newspaper website hosted by the publisher server 102. In other aspects, the search server 132 may take a familiar form and provide various known features available from modern search engine systems.

For example, a user may interact with the browser 108 of the device 106 to access a search page "http://search.com" managed by the search server 132, and to enter a search query 134 comprising one or more terms that include, for example, the phrase "Today's News" into a text field 136 of a search page. The browser 108 may then send a search request that includes the search query 134 to the search server 132 at state (A). In response, the search server 132 may query one more indexes (not shown) against the terms of the search query 134, and return at least one search result 138 that includes content that matches the search query 134 at state (B), and that includes a link directed to a landing page that includes additional content. The browser 108 may then interpret and render the content of the search result 138 in human-readable format including, for example, an article title 140, an article preview 142, and an alert 144.

Similar to the alert 114 described above, the alert 144 may inform a user that the native application 116 is available for use in accessing and interacting with the online newspaper website hosted by the publisher server 102. For example, the user may optionally select the alert 144, and the browser 108 may then request descriptive information that is associated with the native application 116 from the marketplace server 104 at state (C). A sequence of events associated with optionally installing the native application 116 to the device 106 correspond to states (D)-(F) as shown in FIG. 1B, and these respective states in FIG. 1B are similar to states (D)-(F) described above in connection with FIG. 1A. However, FIG. 1B illustrates a number of other states (G) and (H) that correspond to the user interacting with the native application 116 to access resources associated with the online newspaper website as hosted by the publisher server 102. Though termed "states" here, the particular letters more closely represent communications that may occur between the device 106 and the servers 102, 104, and 132 at particular states in the processing of the system 130.

For example, the user may select a link 146 within an article 148 that is associated with the article title 140 to request access to a "Weather" web page managed by the publisher server 102 at state (G). As another example, the user may select the advertisement 112*b* within the display for the native application 116 at state (G) to request access to a web page that includes details and other information related to products or services provided by an entity associated with the advertisement 112*b*. In response to the access request at state (G), the publisher server 102 may return respective content "HTML/JScript/etc." to the native application 116 at state (H). The native application 116 may then interpret and render the content, along with other native application-specific features or functionality, accordingly.

Figure 2:
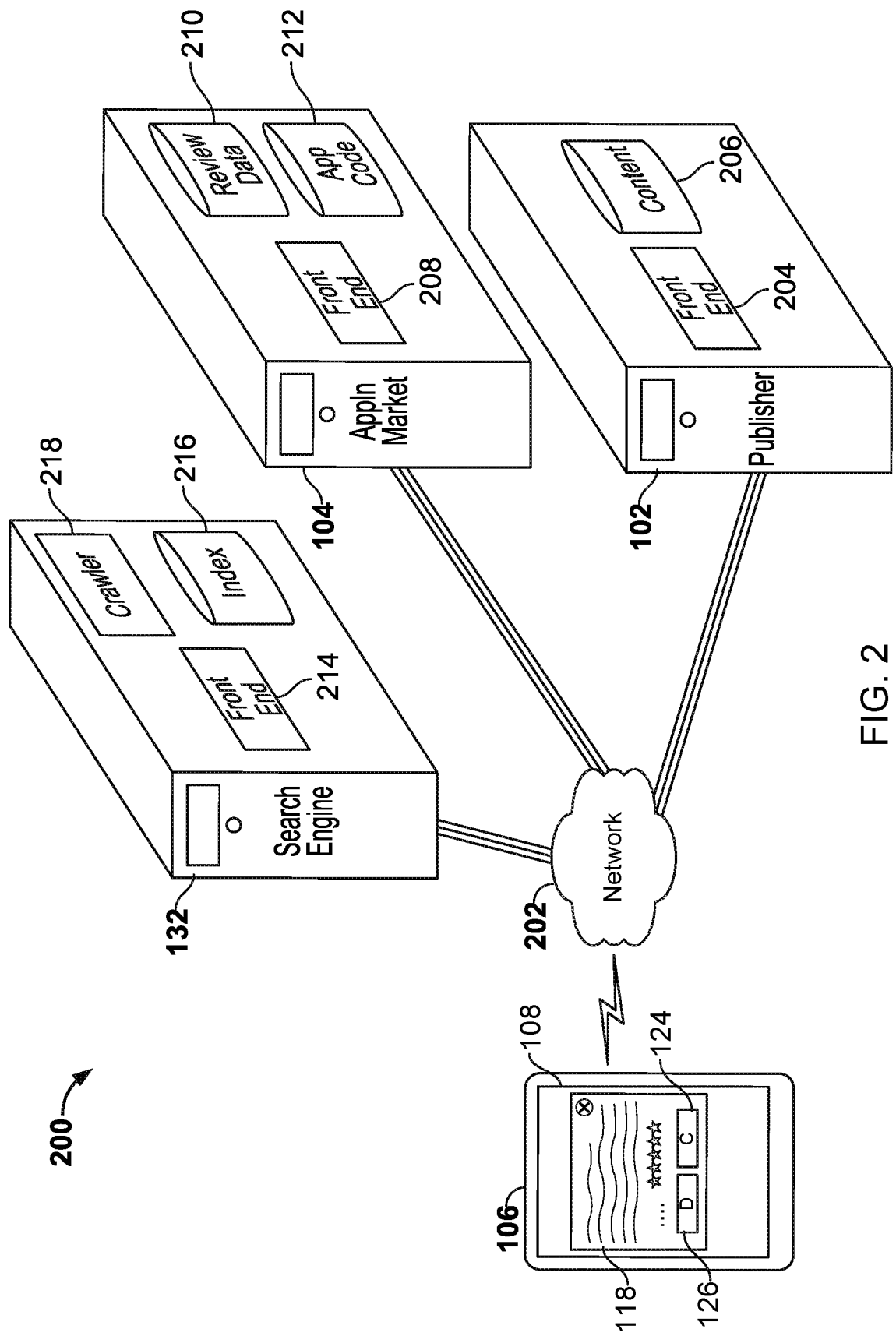
FIG. 2 shows a block diagram of an example system for promoting the use of native computer applications in a networked computing environment.

Referring now to FIG. 2, a block diagram of an example system 200 for promoting the use of native computer applications in a networked computing environment is shown. In general, the system 200 can implement interactions like those discussed with respect to FIGS. 1A and 1B, in processes for identifying the availability of native applications to users of a computing system, and allowing the users to readily download and install those native applications.

The system 200 includes the publisher server 102, marketplace server 104, device 106, and search server 132 of FIGS. 1A and 1B. In this example, the system 200 further includes at least one network 202. The network 202 is a bi-directional data communication path such that data may be transferred among the elements of the system 200. Examples of such a network include any of a number of wireless or hardwired WAN, LAN, Internet, or other packet-based communication networks.

In general, the system 200 may implement the techniques discussed above with respect to FIGS. 1A-1B, and below with respect to FIGS. 3-4.

Example A

In one example scenario, a user may interact with the browser 108 on the device 106 to request access to a web page (e.g., "http://news.com") managed by the publisher server 102. A front end 204 of the publisher server 102 may receive the request for access, query a content repository 206 of the publisher server 102, and return content associated with the requested web page (e.g., HTML/JScript/etc.) to the browser 108. The content returned to the browser 108 may include, among other things, an alert (e.g., alert 114 in FIG. 1A) that when rendered by the browser 108, and optionally selected by the user, generally instantiates a request for descriptive information associated with a particular native application (e.g., native application 116 in FIG. 1A) that may be available for use in accessing and interacting with resources hosted by the publisher server 102.

In this example, a front end 208 of the marketplace server 104 may receive the request for descriptive information from the browser 108, query an information repository 210 of the marketplace server 104, and return descriptive information (e.g., review information 120, rating information 122 in FIG. 1A) associated with the particular native application to the browser 108. The returned descriptive information may be rendered by the browser 108 within the window 118, along with one or both of the cancel control 124 and the download control 126. The download control 126, when optionally selected by the user, may generally instantiate a procedure that downloads and installs the particular native application to the device 106. For example, the front end 208 of the marketplace server 104 may receive an installation request from the browser 108, query an application repository 212 of the marketplace server 104, and return application code associated with the particular native application from the application repository 212 to the device 106 for installation.

Example B

In another example scenario, the user may interact with the browser 108 on the device 106 to enter a search query (e.g., search query 134 in FIG. 1B) comprising one or more terms (e.g., "Today's News") into a text field (e.g., text field 136 in FIG. 1B) of a search page managed by the search server 132 (e.g., "http://search.com"). A front end 214 of the search engine 132 may receive the search query, compare the terms of the search query 134 (in FIG. 1B) against entries of an index 216 of the search engine 132, and return content including at least one search result (e.g., search result 138 in FIG. 1B) to the browser 108. In this example, the index 216 may be continuously updated at least in part by a crawler 218 of the search engine 132, which generally retrieves and parses web pages accessible over the network 202 into text and metadata in accordance with a predefined indexing scheme associated with the index 216.

Search result content returned to the browser 108 may include, among other things, an alert (e.g., alert 144 in FIG. 1B) that when rendered by the browser 108 and optionally selected by the user generally instantiates a request for descriptive information associated with a particular native application (e.g., native application 116 in FIG. 1B) that may be available for use in accessing and interacting with resources hosted by the publisher server 102. The sequence of events associated with generating the window 118, along with at least the cancel control 124 and the download control 126, and optionally installing the native application to the device 106 are similar to the sequence of events described above in connection with the example A.

Figure 3:
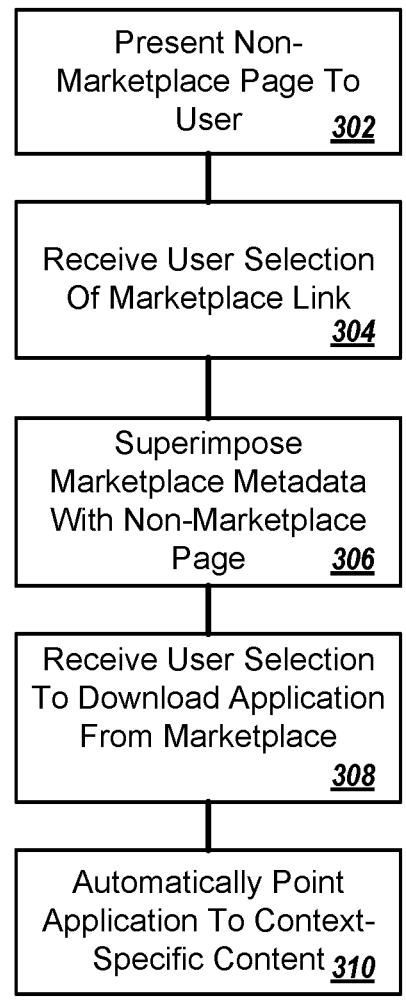
FIG. 3 shows an example process for informing a mobile device user that a native computer application is available for use in interacting with a network-based resource.

Referring now to FIG. 3, an example process 300 is shown for informing a user of a device that a native application is available for use in interacting with a network-based resource. In one example, the process 300 may be implemented by or on the device 106 of FIGS. 1-2.

At 302, a client application on the device sends a request to a website to access a web page. In response, the client application may receive content from the website associated with the web page. In this example, the content at least includes an alert that is intended to notify the user that a native application is available for use in interacting with the website. The client application in turn may interpret and render the content associated with the web page, including the alert, for presentation to the user.

In general, the client application may interact with one or more network-based resources to automatically insert the alert within the web page as presented to the user. For example, the web page itself may have been previously tagged with a pointer (e.g., "<metadata marketplace=http://news.com">) such that, as the client application receives content associated with the web page for rendering, the client application may detect the pointer and send a request to an online software store for data required to insert the alert within the web page. The client application may then receive a response to the data request and populate the web page with the alert for viewing by the user.

In another example, the client application may pass a uniform resource locater (URL) of the web page directly to the online software store as the user points the client application to the web page. For example, when the user selects "Enter" to access the web page, the client application may send a first request to the online software store to retrieve the data required to insert the alert within the web page and a second request to the website to retrieve content associated with the web page for rendering. The client application may then receive a response to both the first request and the second request and populate the web page with the alert for viewing by the user.

At 304, the client application detects selection of a link within the web page by the user. In some implementations, the link is associated with the alert that is rendered within the web page at 302. In this example, the user may optionally select the alert to initiate a request for descriptive information associated with the native application. In general, the descriptive information may enable the user to make a decision as to whether the user would like to install the native application to the device at least for the purpose of interacting with the mobile website.

At 306, the client application sends a request for descriptive information associated with the native application to the online software store. In response, the client application may receive content that includes review information and rating information from the software store, in addition to other information from the application marketplace discussed above. The client application in turn may interpret and render the review information and rating information, along with a cancel control and a download control, for presentation to the user. For example, the client may generate a pop-up window including the review information, rating information, cancel control, and download control in which the pop-up window is adjacent to or at least partially superimposed with the web page which contained the original alert.

Such display of the information from the application marketplace may occur within the browser and while still displaying the web page (i.e., without redirecting the user away from the web page and to a web page for the marketplace)—though the web page may be optionally dimmed in a background area behind where the information from the marketplace is displayed. As such, the user can be provided with marketplace-specific information for the particular native application, without having to leave the original context of the web page (and be taken wholly to the marketplace). As such, the user can make a more intelligent decision about whether to download the native application (because the user has access to price, rating, and review information, for example) while still in the original context of the web page.

At 308, the client application detects selection of the download control by the user. In some implementations, the download control when selected by the user causes the client application to send a request to the software store to instantiate an installation procedure that downloads and installs the native application to the device. In this example, the client application may receive content including application code associated with the native application from the software store following selection of the download control by the user.

At 310, the native application is run on the device following completion of the installation procedure at 308. In some implementations, the native application automatically renders the web page which contained the original alert for viewing by the user. In this example, content of the original web page may be presented by the native application in a more stylized and/or personalized manner. The native application may additionally provide a one or more controls to enable a user to more fully interact with resources offered by the mobile website, in tandem with the features of the device itself.

Figure 4:
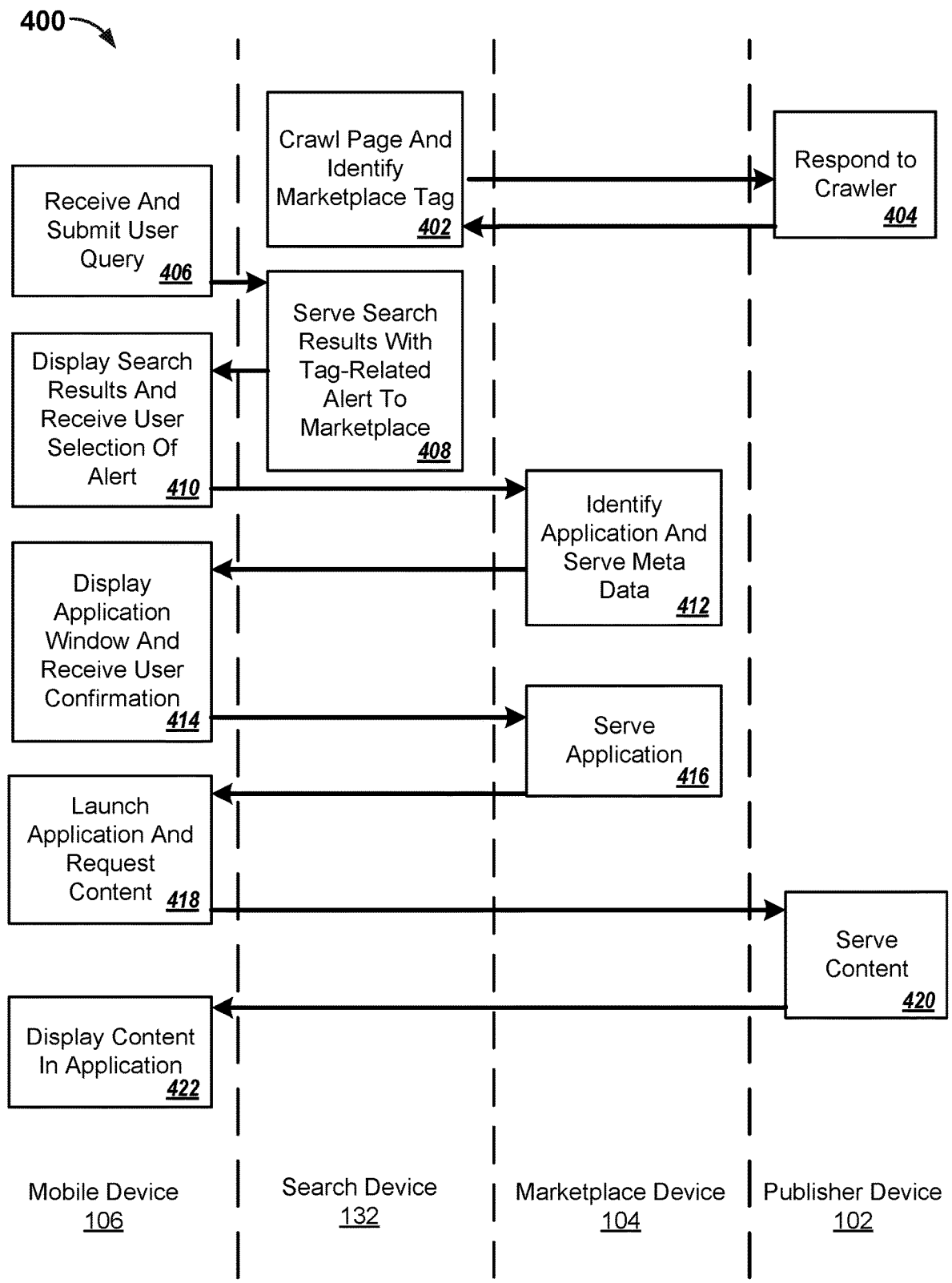
FIG. 4 shows an example timeline diagram that illustrates example interactions among a plurality of computing systems for promoting the use of native computer applications.

Referring now to FIG. 4, an example timeline diagram 400 is shown that illustrates example interactions among a plurality of computing systems for promoting the use of native computer applications in a networked computing environment. In this example, the interactions occur among the publisher server 102, marketplace server 104, device 106, and search server 132 of FIGS. 1-3. However, the steps shown here may be supplemented, rearranged, and performed on different types of systems as appropriate.

The interactions begin at 402 and 404 where a web crawler (e.g., crawler 218) associated with the search server 132 catalogues and indexes at least one web page (e.g., "http://news.com") associated with a website implemented by the publisher server 102. In this example, the web crawler identifies a particular reference or tag (e.g., "<metadata marketplace=http://news.com">) within markup symbols or code associated with the web page (e.g., the HTML representation of the web page). In general, the tag provides a designation that at least one native application (e.g., native application 116) is available for use in interacting with the web page. The form of the tag may be defined by an API or other mechanism so that authors of web pages may code them in a manner that they will be recognized by the crawler.

At 406, a client (e.g., browser 108) associated with the device 106 receives and submits a user search query (e.g., search query 134) comprising one or more terms (e.g., "Today's News") to an interface (e.g., front end 214) of the search server 132. In response, at 408, the interface compares the terms of the search query against entries within a database (e.g., index 216) and returns content to the client including at least one search result (e.g., search result 138). In this example, the search result at least includes a notification (e.g., alert 144) associated with the particular tag that was catalogued and indexed at 402 and 404. In this manner, the notification also provides designation that at least one native application is available for use in interacting with the web page.

At 410, the client displays the search result, receives user selection of the notification within the search result, and submits a request to an interface (e.g., front end 204) of the marketplace server 104 for descriptive information associated with the native application. In response, at 412, the interface of the marketplace server 104 queries a database (e.g., information repository 210), and returns descriptive information (e.g., review information 120, rating information 122) associated with the particular native application to the client. The request for descriptive information may initially point to the search device 132, which may obtain the information from the marketplace device (e.g., one or more servers), and may return the information with data for constructing a user interface around the information, to the device 106.

At 414, the client renders the descriptive information returned from the marketplace server 104 within a display (e.g., window 118), along with at least a confirmation button (e.g., download control 126), receives user selection of the confirmation button within the display, and submits a download request to the interface of the marketplace server 104. In response, at 416, the interface of the marketplace server 104 queries a database (e.g. application repository 212) for application code associated with the particular native application and returns the application code to the device 106 for installation.

At 418, the native application is installed and launched on the device 106. In this example, the native application then automatically sends a request for content associated with the web page to the interface of the publisher device 402. In response, at 420, the interface of the publisher server 102 queries a database (e.g., content repository 206), and returns content (e.g., "HTML/JScript/etc.") associated with the web page to the native application. At 422, the native application displays the web page to the user. In this example, content of the web page may be presented by the native application in a more stylized and/or personalized manner in comparison to the client. The native application may additionally provide a one or more controls to enable a user to more fully interact with resources offered by the web page and/or website, in tandem with the features of the device 106.

Figure 5:
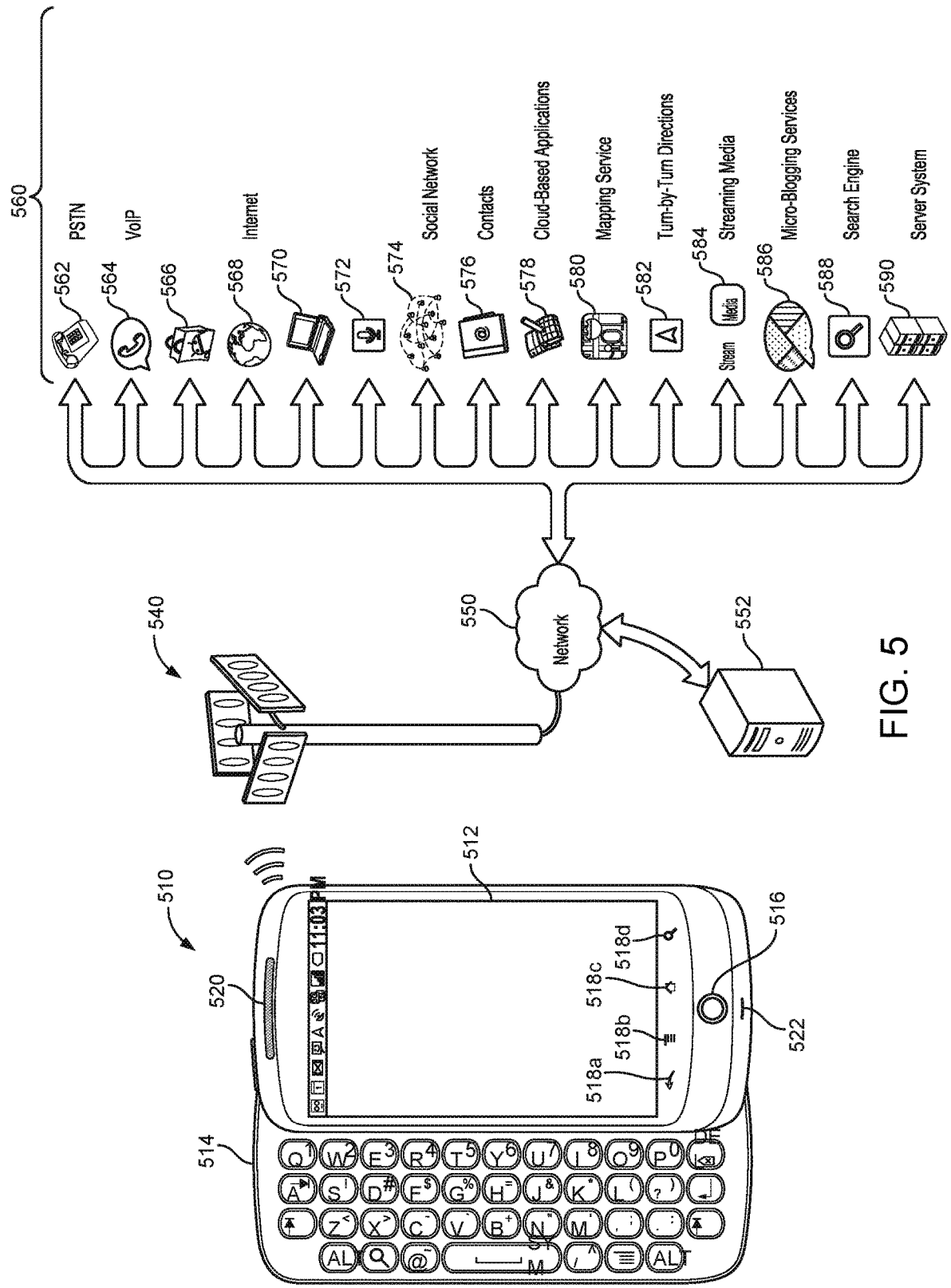
FIG. 5 shows a conceptual diagram of a system that may be used to implement the systems and processes described in this document.

Referring now to FIG. 5, a conceptual diagram of a system that may be used to implement the systems and processes described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full "QWERTY" keyboard or a traditional keypad that includes keys for the digits "0-9" and "*", and "#." The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME OS, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the device's geographical position. A location-identification mechanism may employ satellite-based positioning techniques, base station transmitting antenna identification, multiple base station triangulation, Internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The device 510 may include a digital camera sensor, and corresponding image and video capture and editing software. An Internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the Internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the Internet 568 through network 550. For example, a user of the mobile computing device 510 may invoke a web browser application that requests data from remote computing devices that are accessible at designated universal resource locations. In various examples, some of the services 560 are accessible over the Internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. An example that provides streaming media is YOUTUBE.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of Internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

In accordance with the present disclosure "determining" by a computing system can include the computing system requesting that another device perform the determination and supply the results to the computing system. Moreover, "displaying" or "presenting" by a computing system can include the computing system sending data for causing another device to display or present the referenced information.

Figure 6:
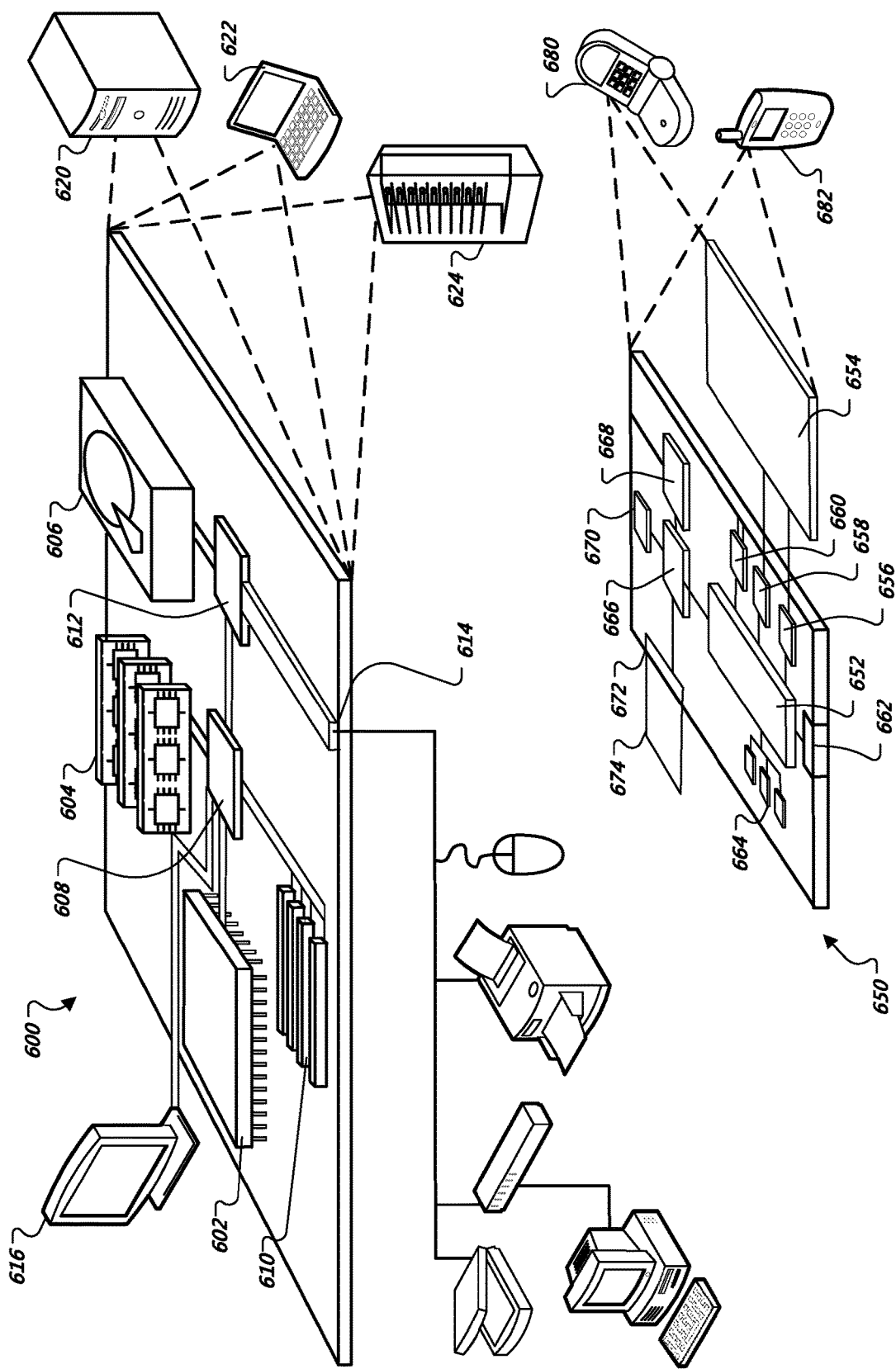
FIG. 6 shows an example of a computing device and a mobile computing device that may be used to implement systems and processes described in this document.

FIG. 6 is a block diagram of computing devices 600, 650 that may be used to implement the systems and processes described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more processes, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device, such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

The processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. The external interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more processes, such as those described above. The information carrier is a computer- or machine-readable medium, such as the memory 664, expansion memory 674, or memory on processor 652 that may be received, for example, over transceiver 668 or external interface 662.

The device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional navigation- and location-related wireless data to device 650, which may be used as appropriate by applications running on device 650.

The device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. "Machine-readable medium" is therefore distinguished from "computer-readable medium."

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and processes described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
providing, from a client application running on a computing device to a first server system, a request to access content associated with a website;
receiving, at the client application and from the first server system, web page information including one or more of markup symbols and code associated with the website;
in response to receiving the web page information, sending, by the client application, a request to an application marketplace for data for inserting an alert relating to a native application that is associated with the website;
receiving, at the computing device from the application marketplace, the data for inserting an alert relating to the native application that is associated with the website;
inserting, by the client application, the alert relating to the native application into the one or more of the markup symbols and code of the web page information associated with the website, wherein the alert is to be displayed inline with and does not obscure any of the content associated with the website; and
displaying, on a display of the computing device and using the web page information with the alert relating to the native application, a web page that is associated with the website and that includes the alert relating to the native application inline with the content associated with the website, wherein the alert does not obscure any of the content associated with the website.

2. The method of claim 1, further comprising:
receiving a user selection of a link associated with the alert; and
in response to receiving the user selection of the link, displaying descriptive information about the native application.

3. The method of claim 2, wherein the descriptive information is displayed as a pop-up window.

4. The method of claim 3, wherein the web page is dimmed when the descriptive information is displayed as a pop-up window.

5. The method of claim 2, wherein the descriptive information comprises review information and rating information.

6. The method of claim 1, further comprising:
receiving a user selection of a download control; and
in response to receiving the user selection of the download control, causing the client application to send a request to an application marketplace to instantiate an installation procedure that downloads and installs the native application to the computing device.

7. The method of claim 6, wherein the native application is downloaded to the computing device only after a user confirms an intent to perform a download.

8. The method of claim 6, further comprising:
receiving, at the client application, application code associated with the native application from the application marketplace.

9. The method of claim 6, further comprising:
after the installation procedure is completed, automatically rendering, with the native application, the web page.

10. The method of claim 1, wherein the native application provides one or more controls to enable a user to interact with content of the web page.

11. A method comprising:
providing, from a client application running on a computing device to a first server system, a request to access content associated with a first website;
receiving, at the client application and from the first server system, web page information including one or more of markup symbols and code associated with the first website;
in response to receiving the web page information, sending, by the client application, a request to an application marketplace for data for inserting an alert relating to a native application that is associated with the first website;
receiving, at the computing device from the application marketplace, the data for inserting the alert relating to the native application that is associated with the first website;
inserting, by the client application, the alert relating to the native application into the one or more of the markup symbols and code of the web page information associated with the first website, wherein the alert is to be displayed inline with and does not obscure any of content associated with the first website; and
displaying, on a display of the computing device and using the web page information with the alert relating to the native application, the content and the alert relating to the native application inline with the content associated with the first website, wherein the alert does not obscure any of the content associated with the first website.

12. The method of claim 11, further comprising:
receiving a user selection of a link associated with the alert; and
in response to receiving the user selection of the link, displaying descriptive information about the native application.

13. The method of claim 12, wherein the descriptive information is displayed as a pop-up window.

14. The method of claim 13, wherein the web page is dimmed when the descriptive information is displayed as a pop-up window.

15. The method of claim 12, wherein the descriptive information comprises review information and rating information.

16. The method of claim 11, further comprising:
receiving a user selection of a download control; and
in response to receiving the user selection of the download control, causing the client application to send a request to an application marketplace to instantiate an installation procedure that downloads and installs the native application to the computing device.

17. The method of claim 16, wherein the native application is downloaded to the computing device only after a user confirms an intent to perform a download.

18. The method of claim 16, further comprising:
receiving, at the client application, application code associated with the native application from the application marketplace.

19. The method of claim 11, wherein the native application provides one or more controls to enable a user to interact with content of the web page.

20. A non-transitory computer-readable storage medium having instructions encoded therein that, when executed by at least one processor, cause the at least one processor to perform operations comprising:
providing, from a client application running on a computing device to a first server system, a request to access content associated with a website;
receiving, at the client application and from the first server system, web page information including one or more of markup symbols and code associated with the website;
in response to receiving the web page information, sending, by the client application, a request to an application marketplace for data for inserting an alert relating to a native application that is associated with the website;
receiving, at the computing device from the application marketplace, the data for inserting an alert relating to the native application that is associated with the website;
inserting, by the client application, the alert relating to the native application into the one or more of the markup symbols and code of the web page information associated with the website, wherein the alert is to be displayed inline with and does not obscure any of the content associated with the website; and
displaying, on a display of the computing device and using the web page information with the alert relating to the native application, a web page that is associated with the website and that includes the alert relating to the native application inline with the content associated with the website, wherein the alert does not obscure any of the content associated with the website.

* * * * *